(12) United States Patent
Zhou

(10) Patent No.: US 11,353,333 B2
(45) Date of Patent: Jun. 7, 2022

(54) DYNAMIC RESTYLING OF DIGITAL MAPS

(71) Applicant: GOOGLE LLC, Mountain View, CA (US)

(72) Inventor: Bailiang Zhou, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/488,726

(22) PCT Filed: Sep. 25, 2018

(86) PCT No.: PCT/US2018/052680
§ 371 (c)(1),
(2) Date: Aug. 26, 2019

(87) PCT Pub. No.: WO2020/068054
PCT Pub. Date: Apr. 2, 2020

(65) Prior Publication Data
US 2021/0333120 A1    Oct. 28, 2021

(51) Int. Cl.
*G01C 21/36*    (2006.01)

(52) U.S. Cl.
CPC ....... *G01C 21/367* (2013.01); *G01C 21/3638* (2013.01); *G01C 21/3644* (2013.01)

(58) Field of Classification Search
CPC .............. G01C 21/367; G01C 21/3638; G01C 21/3644; G01C 21/3667; G01C 21/3661; G01C 21/3605; G01C 21/3635; G01C 21/3673; G01C 21/3679; G01C 21/32; G01C 21/36; G06T 11/00; G06T 11/203; G06T 15/04; G06T 19/20; G06T 17/05; G06T 11/20; G09B 29/007; G09B 29/106; G09B 29/00; G09B 29/10; G06F 16/29
See application file for complete search history.

(56) References Cited

U.S. PATENT DOCUMENTS

| 8,681,176 B1 | 3/2014 | Maurer et al. |
| 9,534,916 B2 | 1/2017 | Geelen et al. |

(Continued)

FOREIGN PATENT DOCUMENTS

| JP | 2004-86508 A | 3/2004 |
| JP | 2009-31802 A | 2/2009 |
| JP | 2011-521280 A | 7/2011 |
| JP | 2012-168196 A | 9/2012 |

(Continued)

OTHER PUBLICATIONS

Search Report for International application No. PCT/US2018/052680, dated Jul. 11, 2019.

(Continued)

*Primary Examiner* — Abby Y Lin
*Assistant Examiner* — Dylan Brandon Mooney
(74) *Attorney, Agent, or Firm* — Marshall, Gerstein & Borun LLP

(57) ABSTRACT

To dynamically restyle map features related to a navigation route on a digital map, a server device and/or a client device selectively applies different visual styles to certain map features to emphasize and de-emphasize navigation routes or other logically linked sets of map features. For example, the server device instructs the client device to visually emphasize the road segments included in the navigation route, de-emphasize road segments not in the navigation route, and leave the remaining features at the default (standard) level of detail. The client device then re-renders the map features accordingly.

17 Claims, 7 Drawing Sheets

(56) References Cited

U.S. PATENT DOCUMENTS

| | | |
|---|---|---|
| 10,067,950 B1 | 9/2018 | Zyskowski et al. |
| 2006/0129316 A1 | 6/2006 | Park |
| 2011/0050732 A1 | 3/2011 | Arrasvuori |
| 2013/0035853 A1* | 2/2013 | Stout ..................... G06F 16/29 |
| | | 701/438 |
| 2013/0321450 A1* | 12/2013 | Hultquist ................. G06F 3/14 |
| | | 345/619 |
| 2014/0267282 A1* | 9/2014 | Ren ....................... G09G 5/391 |
| | | 345/428 |

FOREIGN PATENT DOCUMENTS

| | | |
|---|---|---|
| JP | 2012-220370 A | 11/2012 |
| KR | 10-2006-0066859 A | 6/2006 |
| WO | WO-2013020075 A2 | 2/2013 |
| WO | WO-2016/124774 A1 | 8/2016 |

OTHER PUBLICATIONS

Written Opinion for International application No. PCT/US2018/052680, dated Jul. 11, 2019.
Notice of Reasons for Rejection for Japanese Application No. 2020-516433, dated May 17, 2021.
Notice of Reasons for Rejection for Japanese Application No. 2020-516433, dated Jan. 4, 2021.
First Examination Report for India Application No. 202047018520, dated Jun. 24, 2021.
Office Action for Korean Application No. 10-2020-7013577, dated Nov. 15, 2021.

* cited by examiner

| | 210<br>Minimal style | 220<br>Standard style | 230<br>Rich style |
|---|---|---|---|
| Building | 210a | 220a | 230a |
| Roads | 210b | 220b | 230b |

DYNAMIC RESTYLING OF DIGITAL MAPS

FIELD OF THE DISCLOSURE

This disclosure relates to interactive digital maps and, more particularly, to dynamically restyling map features related to navigation routes on digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Interactive digital maps, which various geographic applications display on computing devices, generally depict numerous geographic or map features, such as roads, outlines of countries and towns, bodies of water, buildings, points of interest (POIs), etc. Some of these geographic or map features can be depicted differently in different situations. For example, a road normally depicted as a blue line can be rendered in red to illustrate heavy traffic, or the boundary of a county can be highlighted in response to a geographic query.

Additionally, the various geographic applications generate step-by-step navigation directions. Typically, a server generates an image in which a navigation route is highlighted. The server also specifies the location of a pin to depict the destination. In addition to requiring that extra data be transmitted via a communication network, this approach often results in the highlighting and pins obscuring important map features.

SUMMARY

To present a navigation route in a digital map display, a dynamic mapping system utilizes multiple visual styles, e.g., "minimal," "standard," and "rich" for various map features such as roads, buildings, parks, bodies of water, POIs, etc. To illustrate a navigation route, the dynamic mapping system can emphasize a set of map features by rendering these features with a different visual style. For example, the first set of map features may include several road segments included in the navigation route along with a building corresponding to the destination. Accordingly, the dynamic mapping system renders the road segments and the building in a rich style, which may include a higher level of detail (LOD) or other differences in visual characteristics. For example, for the rich style, the system may render road segments with thick lines having a dividing line in the center and two sets of dashed lines on each side of the dividing line. The system may render buildings as three-dimensional (3D) or 2.5D objects, such as a cube-shaped or rectangular prism-shaped objects.

Additionally, the dynamic mapping system in some embodiments identifies a second set of map features within the digital map display that are not related to the navigation route. The system may render the second set of map features in a minimal style, which may include a lower level of detail, to de-emphasize the second set of map features that are not related to the navigation route and to provide a contrast with the first set of map features rendered with the rich style. For example, for the minimal style, the system may render road segments with thin lines. The system may render buildings as two-dimensional squares or rectangular-shaped objects with thin lines.

Furthermore, the system may render a third set of map features within the digital map display in a standard style, which may include a default level of detail. For example, for the standard style, the system may render road segments with medium lines which are thicker than the thin lines used in the minimal style and thinner than the thick lines used in the rich style. The system may render buildings as two-dimensional squares or rectangular-shaped objects with lines that are thicker than the lines used to render buildings in the minimum style and with a shadow, such that the buildings appear raised.

In this manner, the system need not depict the destination of the navigation route with a pin or overlay icon and instead can emphasize the destination with the rich style. Moreover, a server does not need to generate an overlay to highlight a navigation route, and instead the server can simply provide instructions to the client device to render certain map features with different visual styles or, in another implementation, simply provide a description of the navigation route to the client device, and the client device may in turn select map features for emphasis based on the received description of the navigation route.

One example embodiment of the techniques of this disclosure is a method for illustrating navigation directions on a digital map. The method includes generating a digital map of a geographic area, including providing map features included in the digital map at a default level of detail and obtaining a navigation route to a destination located in the geographic area. The method further includes identifying a first plurality of map features corresponding to physical entities located in the geographic area and related to the navigation route, and generating a modified digital map, including re-rendering the first plurality of map features at a high level of detail, where the modified digital map includes map features displayed at a level of detail lower than the high level of detail.

Another example embodiment of the techniques of this disclosure is a server device for illustrating navigation directions on a digital map. The server device includes one or more processors and a non-transitory computer-readable memory coupled to the one or more processors and storing thereon instructions. The instructions, when executed by the one or more processors, cause the server device to generate a digital map of a geographic area, including provide map features included in the digital map at a default level of detail, and obtain a navigation route to a destination located in the geographic area. The instructions further cause the server device to identify a first plurality of map features corresponding to physical entities located in the geographic area and related to the navigation route and generate a modified digital map, including re-render the first plurality of map features at a high level of detail, where the modified digital map includes map features displayed at a level of detail lower than the high level of detail.

Yet another example embodiment of the techniques of this disclosure is a client device for illustrating navigation directions on a digital map. The client device includes one or more processors and a non-transitory computer-readable memory coupled to the one or more processors and storing thereon instructions. The instructions, when executed by the one or more processors, cause the client device to display a digital map of a geographic area including map features presented at a default level of detail and receive a request for navigation directions to a destination located in the geographic area. The instructions further cause the client device to obtain descriptions of a first plurality of map features corresponding to physical entities located in the geographic area and related to a navigation route to the destination, display the first plurality of map features within the digital map at a high level of detail, and display other map features within the digital map at a level of detail lower than the high level of detail.

BRIEF DESCRIPTION OF THE DRAWINGS

FIG. 2 is an example style table graphically depicting visual styles which the dynamic mapping system of FIG. 1 can utilize to render map features;

DETAILED DESCRIPTION OF THE DRAWINGS

General Overview

Figure 1:
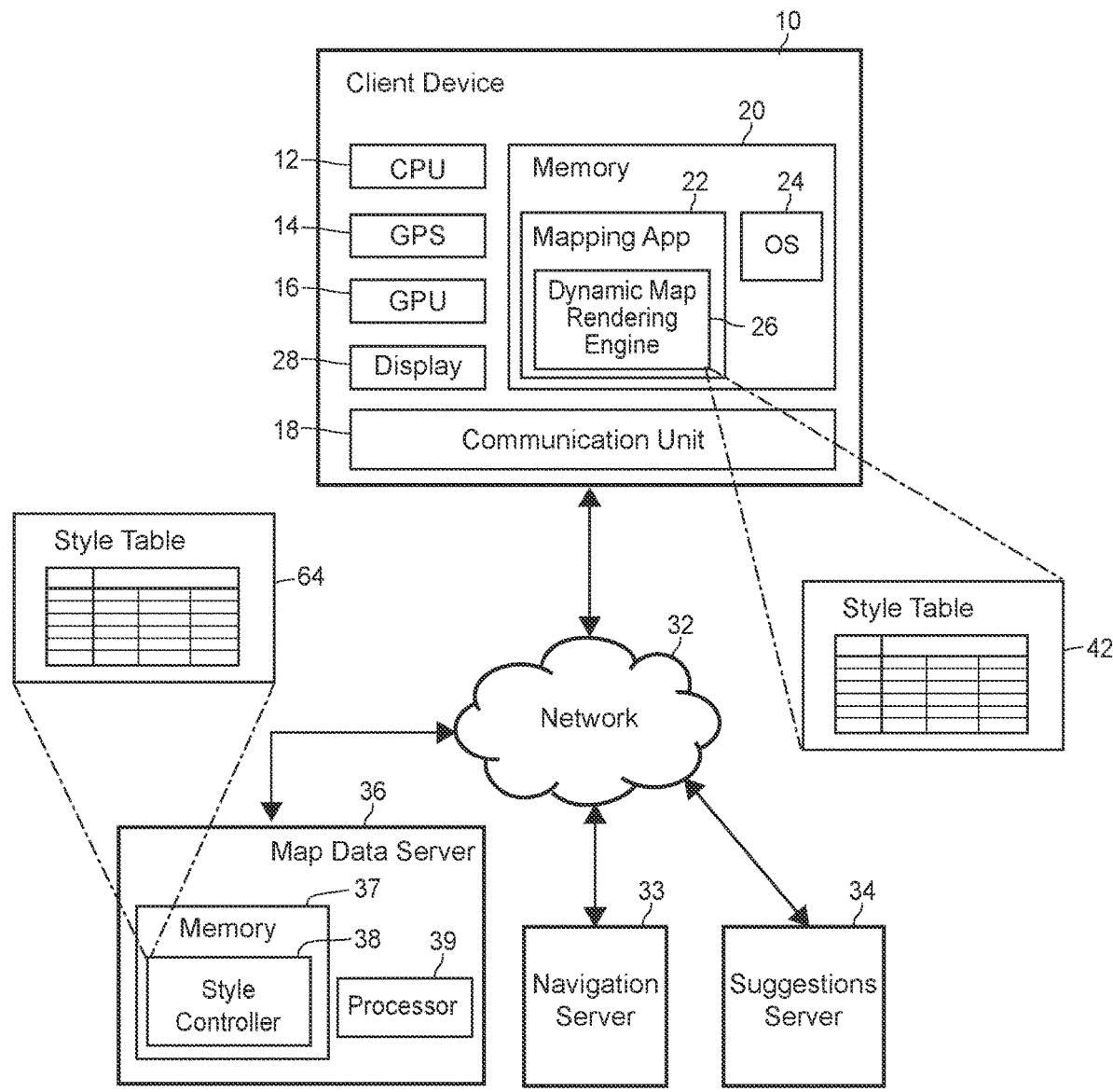
FIG. 1 is a block diagram of an example system in which techniques for dynamically restyling map features can be implemented.

The present disclosure provides a technique for efficiently re-generating a digital map by selectively modifying, by a client device and/or network server, the visualization of certain map features. This eliminates the need to generate a new image or provide an overlay to highlight the navigation route as well as the need to provide pins or other overlay icons to designate locations. The disclosure provides a particularly efficient mechanism for selectively modifying visualization of map features, thereby reducing bandwidth requirements and processing overhead.

In particular, the system can utilize multiple visual styles, e.g., "minimal," "standard," and "rich" for various map features such as roads, buildings, parks, bodies of water, POIs, etc. These visual styles can be applied to geometries of map features defined in a vector graphics format, or another suitable format for specifying geometric shapes using mathematical descriptions of points and paths connecting the points. For convenience, data conforming to any one of such formats is referred to as "vector data." More particularly, vector data may specify various geometric shapes (e.g., using mathematical descriptions) and indicate how these shapes should be positioned for rendering various map features, while style data may describe such visual characteristics or properties as line thickness (e.g., width in pixels referred to herein as "pt"), line color, one or more fill colors, one or more shapes or graphics, shadow color, shadow thickness, etc. for various visual styles that may be applied to the vector data. A network server and/or a client device can selectively apply different visual styles to certain map features to emphasize and de-emphasize navigation routes or sets of map features. In some embodiments, the network server also may specify which visual styles the client device should apply to various vector-based descriptions of map features (also referred to herein as vector descriptors or simply vectors).

As a more specific example, the server can instruct the client device to visually emphasize the road segments included in the navigation route, de-emphasize road segments not in the navigation route, and leave the remaining features at the default (standard) level of detail. The server also can instruct the client device to visually emphasize a set of map features responsive to a search query. A set of map features related to a navigation route or a search query generally can include any number of features of one or multiple types (e.g., road segments, buildings, parks) as well as associated labels.

In one example embodiment, the client device receives from a network server and stores in the local memory definitions for multiple visual styles for the map features included in the digital map. The client device initially can display all of the map features for a certain geographic area in the standard style. To illustrate a navigation route, the server specifies which map features the client device should re-render in the rich style and (in some cases) which map features the client device should re-render in the minimal style.

In another example embodiment, the server initially provides map features along with only the standard style. To illustrate a navigation route, the server in this case provides descriptions of rich styles for various map features as well as indications of which map features should be re-rendered in these styles.

Example Hardware and Software Components

Referring to FIG. 1, an example communication system in which the techniques outlined above can be implemented includes a client computing device 10 (also referred to herein as a "client device"). The client device 10 may be a portable device such as smart phone or a tablet computer, for example. The client device 10 may also be a laptop computer, a desktop computer, or a personal digital assistant (PDA). The client device 10 also can communicate with various content providers, servers, etc. via a wired or wireless communication network 32 such as a fourth- or third-generation cellular network (4G or 3G, respectively). The client device 10 can include a display 28 such as a touch-screen. The display may include a software keyboard for entering text input. Additionally, the client device 10 includes a graphics processing unit (GPU) 16, one or more processors or CPUs 12, a GPS module 14, a memory 20, and a cellular communication unit 18 to transmit and receive data via a 3G cellular network, a 4G cellular network, or any other suitable network.

The memory 20 can store, for example, instructions of an operating system 24, and a dynamic map rendering engine 26 as part of a mapping application 22. The dynamic map rendering engine 26 can receive and store style data such as a style table 42 for styling map features in a digital map display. Further, the dynamic map rendering engine 26 can receive navigation directions to a destination from a style controller 38, where the navigation directions include a first set of map features related to a navigation route. The dynamic map rendering engine 26 can render the first set of map features according to one of the styles included in the style data. Together, the dynamic map rendering engine 26 and the style controller 38 can form a dynamic mapping system.

The software components 22, 24, and 26 can include compiled instructions and/or instructions in any suitable programming language interpretable at runtime. In any case, the software components 22, 24, and 26 execute on the one or more processors 12.

The mapping application 22 generally can be provided in different versions for different respective operating systems. For example, the maker of the client device 10 can provide a Software Development Kit (SDK) including the mapping application 22 for the Android™ platform, another SDK for the iOS™ platform, etc.

The client device 10 has access to a wide area communication network 32 such as the Internet via a long-range wireless communication link (e.g., a cellular link). The client device 10 can access the communication network 32 via a cellular communication unit 18. In the example configuration of FIG. 1, the client device 10 communicates with a navigation server 33 that provides navigation data and a map data server 36 which generates map data (e.g., in a vector graphics format).

In some implementations, the map data server 36 includes a memory 37 and one or more processors 39. The memory 37 may be tangible, non-transitory memory and may include any types of suitable memory modules, including random access memory (RAM), read-only memory (ROM), flash memory, other types of persistent memory, etc. The memory 37 stores instructions executable on the processors 39 that make up a style controller 38 which generates several visual styles and provides the visual styles to the dynamic map rendering engine 26, for example in a style table 64.

The style controller 38 may utilize and, in some embodiments, manage a style table 64 that indicates visual characteristics for various styles. An example implementation of a style table that may be used as the style table 64 is discussed in more detail with reference to FIG. 2. In an embodiment, the style controller 38 uses the style table 64 to determine which of the styles should be applied to various map features at the client device 10 and generates an appropriate indication for the client device 10.

In some embodiments, a user requests map data for a geographic area via the mapping application 22. Accordingly, the client device 10 provides the request to the map data server 36, which in turn, retrieves the map data for the geographic area from the map database 40. The map data may include several map features which can be, for example, two- and three-dimensional shapes representing roads, buildings, parks, POIs, bodies of water, boundaries of cities, and other geographic entities. The style controller 38 also retrieves descriptions of visual styles to be applied to the map features, for example from the style table 64.

The style controller 38 then provides the descriptions of visual styles along with the map data to the client device 10, and the dynamic map rendering engine 26 renders the map features according to respective visual styles and presents a digital map display including the rendered map features. In some embodiments, the style controller 38 provides the default visual styles used to render the map features. For example, the style controller 38 provides the standard style, corresponding to the default level of detail, to the dynamic map rendering engine 26, and the dynamic map rendering engine 26 renders each of the map features according to the standard style.

In other embodiments, the style controller 38 provides descriptions of several visual styles to the dynamic map rendering engine 26 (e.g., minimal, standard, and rich styles), and the dynamic map rendering engine 26 determines the appropriate style in which to render each map feature. In yet other embodiments, the style controller 38 provides descriptions of several visual styles to the dynamic map rendering engine 26 (e.g., minimal, standard, and rich styles) along with indications of the visual styles to apply to each of the map features. For example, the style controller 38 may provide instructions for styling each map feature (e.g., render the first set of map features related to the navigation route in the rich style, render the second set of map features not related to the navigation route in the minimal style, etc.).

In response to a request for navigation directions to a destination provided to the map data server 36 via the mapping application 22, the style controller 38 retrieves a navigation route to the destination from the navigation server 33 or generates the navigation route locally using offline data. The style controller 38 then identifies each of the map features corresponding to physical entities located in the geographic area and related to the navigation route, such as a set of road segments along the navigation route, a building corresponding to the destination, a POI, etc. Then the style controller 38 provides descriptions of the map features related to the navigation route to the client device 10 as a first set of map features. For example, the descriptions of the map features may include descriptions of road geometries. In some embodiments, the dynamic map rendering engine 26 then generates a modified digital map by re-rendering the first set of map features using the rich style.

In other embodiments, the style controller 38 provides the map features related to the navigation route to the client device 10 as a first set of map features with the style data for the rich style and/or with instructions for the dynamic map rendering engine 26 to re-render the first set of map features using the rich style.

The modified digital map also includes map features displayed at a level of detail lower than the high level of detail corresponding to the rich style. More specifically, in some embodiments, the style controller 38 provides map features not related to the navigation route to the client device 10 as a second set of map features. The dynamic map rendering engine 26 then generates the modified digital map by re-rendering the second set of map features using the minimal style, and the remaining map features using the standard style. In particular, the request for navigation directions may specify styles for which style data is already available at the client device 10 (e.g., styles stored in the style table). If the client device 10 has not yet received style data for the rich style or the minimal style, the map data server 36 provides the corresponding style data.

In other embodiments, the dynamic map rendering engine 26 re-renders each of the map features included in the digital map display and which are not in the first set of map features using the minimal style. In yet other embodiments, the style controller 38 provides map features not related to the navigation route to the client device 10 as a second set of map features (e.g., map features within a threshold distance of the map features related to the navigation route) with the style data for the minimal style and/or with instructions for the dynamic map rendering engine 26 to re-render the second set of map features using the minimal style. Also in another embodiment, the style controller 38 renders each of the map features according to the appropriate style and provides the rendered map features to the client device 10, for example in a raster image.

The style controller 38 and/or dynamic map rendering engine 26 can identify map features related to a navigation route or a search query according to any suitable distance- and/or relevance-based scheme. For example, upon generating a navigation route, the style controller 38 can identify road segments that make up the navigation route and each structure (e.g., a building, a bridge, a tunnel) within a certain distance from the route (e.g., 20 meters), and include the identified road segments and structures in a set of map features to be rendered using the rich style. In some cases, the style controller 38 also can include in this set of map features landmarks of a certain threshold prominence (measured in terms of size, visibility, color contrast with nearby structures) within a certain distance from the route (e.g., 50 meters). Further, in some cases, the style controller 38 can include in this set of map features points-of-interest of certain threshold popularity.

Further, the style controller 38 and/or dynamic map rendering engine 26 can dynamically vary the content of the set of map features to be emphasized on the digital map based on the current location of the client device 10 or another suitable signal. As a more specific example, the dynamic map rendering engine 26 can render map features within a certain radius of the current location of the client device 10 moving along a navigation route using the rich style, render the map features associated with other portions of the navigation route using the standard style, and render map features unrelated to the navigation route using the minimal style. In this manner, the client device 10 appears to move in a "bubble" of highly detailed map features along the route.

The memory 37, or the memory in another server, can also store instructions for generating map data or for calling on the navigation server 33 to generate navigation directions.

More generally, the client device 10 can communicate with any number of suitable servers. For example, in another embodiment, a suggestions server 34 generates suggestions based on partial user input, a traffic data server provides traffic updates along a route, a weather data server provides weather data and/or alerts, etc.

For simplicity, FIG. 1 illustrates the map database 40 as only one instance of a database. However, the map database 40 according to some implementations includes a group of one or more databases, each storing different information. In addition, FIG. 1 illustrates the map data server 36 as only one instance of a server. However, the map data server 36 according to some implementations include a group of one or more map data servers, each equipped with one or more processors and capable of operating independently of the other map data servers. Map data servers operating in such a group can process requests from the client device 10 individually (e.g., based on availability), in a distributed manner where one operation associated with processing a request is performed on one map data server while another operation associated with processing the same request is performed on another map data server, or according to any other suitable technique. For the purposes of this discussion, the term "map data" may refer to an individual map data server or to a group of two or more map data servers.

FIG. 2 illustrates an example style table 200 graphically depicting visual styles for various types of map features. More specifically, the style table 200 in this example includes three visual styles: a minimal style 210, a standard style 220, and a rich style 230. For a particular visual style, the style table 200 includes a set of visual attributes or configuration parameters for each type of map feature. For example, for the minimal style 210, the set of configuration parameters for a building 210a include a two-dimensional square-shaped object with thin lines (e.g., having a line thickness of 1 pt.). The fill color for the minimal style building 210a is white, the outline color is light grey, and there is no shadow. For the standard style 220, the set of configuration parameters for a building 220a include a two-dimensional square-shaped object with thicker lines (e.g., having a line thickness of 2 pt.). The fill color for the minimal style building 220a is white, the outline color is light grey, and there is a light grey shadow. For the rich style 230, the set of configuration parameters for a building 230a include a three-dimensional cube or rectangular prism-shaped graphic with a triangle on the top surface and having a white fill color, light grey outline color, and a larger and darker shadow than the standard style building 220a.

In another example, for the minimal style 210, the set of configuration parameters for a road 210b include a thin line (e.g., having a line thickness of 1 pt.) with a dark grey line color. For the standard style 220, the set of configuration parameters for a road 220b include a thicker line (e.g., having a line thickness of 3 pt.) with a dark grey line color. For the rich style 230, the set of configuration parameters for a road 230b include an even thicker line graphic (e.g., having a line thickness of 5 pt.) with a white dividing line in the center, two sets of white dashed lines on each side of the dividing line, and a dark grey fill color.

As illustrated in the example style table 200, the rich style 230 has the highest level of detail while the standard style 220 has a medium or default level of detail and the minimal style 210 has a low level of detail. In this manner, the digital map display presents a stark contrast between map features rendered in the rich style 230 and map features rendered in the minimal 210 or even standard styles 220 to emphasize those map features in the rich style 230 (e.g., map features related to a navigation route) and de-emphasize those map features in the minimal style 210. While the style table 200 depicts visual styles for two types of map features including buildings and roads, these are merely example map feature types which may be included in the style table 200. The style table 200 may also include visual styles for additional map features types, such as parks, POIs, bodies of water, boundaries of cities, and other geographic entities. Furthermore, the set of configuration parameters for each visual style and map feature type are merely one example set of configuration parameters. A map feature type and visual style (e.g., a minimal style building) may include any suitable configuration parameters, such that for a particular map feature type, the minimal style has the lowest level of detail, the standard style has a medium or default level of detail, and the rich style has the highest level of detail. The set of configuration parameters may include for example, a particular line thickness, a particular fill color, a particular outline color, a particular shape or graphic, a particular shadow color, a particular shadow thickness, etc.

Thus, in some implementations, a description of minimal, standard, and rich styles includes only a description of visual attributes (e.g., color, line thickness, stroke type) which a graphics pipeline such as OpenGL applies to the same geometry. In other implementations, a description of minimal, standard, and rich styles includes a description of additional geometries, along with the corresponding visual attributes, to be added to a map feature rendered in a simpler style.

In some embodiments, the style controller 38 as shown in FIG. 1 generates the style table 200 including a set of configuration parameters for each visual style and map feature type and provides the style table 200 to the dynamic map rendering engine 26 to render map features according to the appropriate visual style. For example, the dynamic map rendering engine 26 may be configured to render map features in a digital map without a navigation route in the standard style 220. When there is a navigation route to display, the dynamic map rendering engine 26 may be configured to render map features in a digital map related to the navigation route in the rich style 230 and map features that are not related to the navigation route in the minimal style 210. In other embodiments, when there is a navigation route, the dynamic map rendering engine 26 may be configured to render map features in a digital map related to the navigation route in the rich style 230, map features within a threshold distance of the map features related to the navigation route in the minimal style 210, and remaining map features in the standard style 220. In yet other embodiments, the style controller 38 may provide instructions to the dynamic map rendering engine 26 describing the appropriate visual style in which to render each map feature in the digital map.

Example Map Displays

Figure 3:
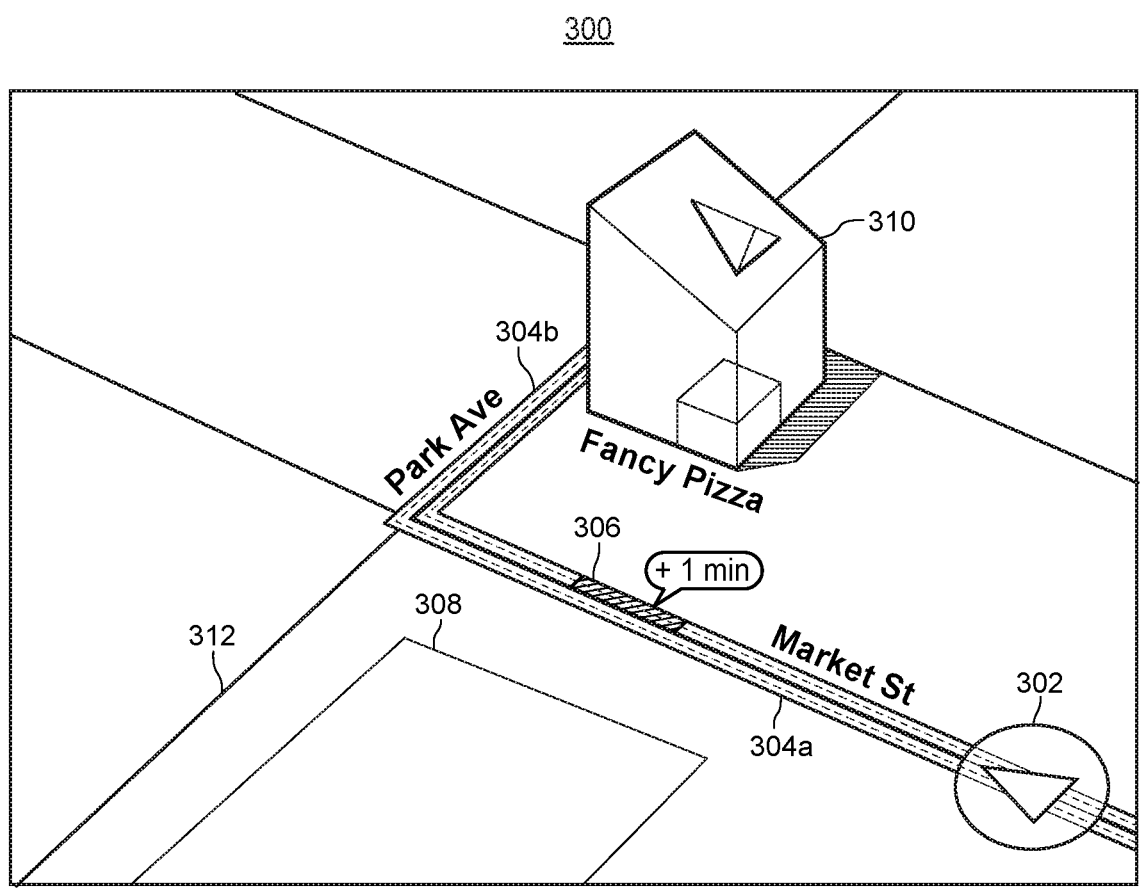
FIG. 3 is an example map display including a navigation route with map features related to the navigation route rendered in a rich style.

FIG. 3 illustrates an example map display 300 including a navigation route 304a, 304b to a destination which is a building 310 that includes the Fancy Pizza restaurant. The mapping application 22 can present the example map display 300 via the display 28 of the client device 10. The navigation route in this example includes road segments 304a, 304b for navigating the user to the building 310 including the Fancy Pizza restaurant. Accordingly, the dynamic mapping system identifies the road segments 304a, 304b and the building 310 as map features related to the navigation route. The dynamic mapping system renders these features in the rich style 230, as shown in FIG. 2. In this example, the dynamic mapping system renders the remaining map features such as the road segment 312 and the park 308 in the minimal style 210, as also shown in FIG. 2. The map display 300 also includes an indication of the user's current location 302 along the navigation route and an overlay 306 indicating traffic along the route. While the client device 10 does not display an overlay on the digital map corresponding to the navigation route, other information such as traffic data may be depicted with highlighting, such as a red color overlaying a portion of the road segment 304a rendered in the rich style 230.

Figure 4:
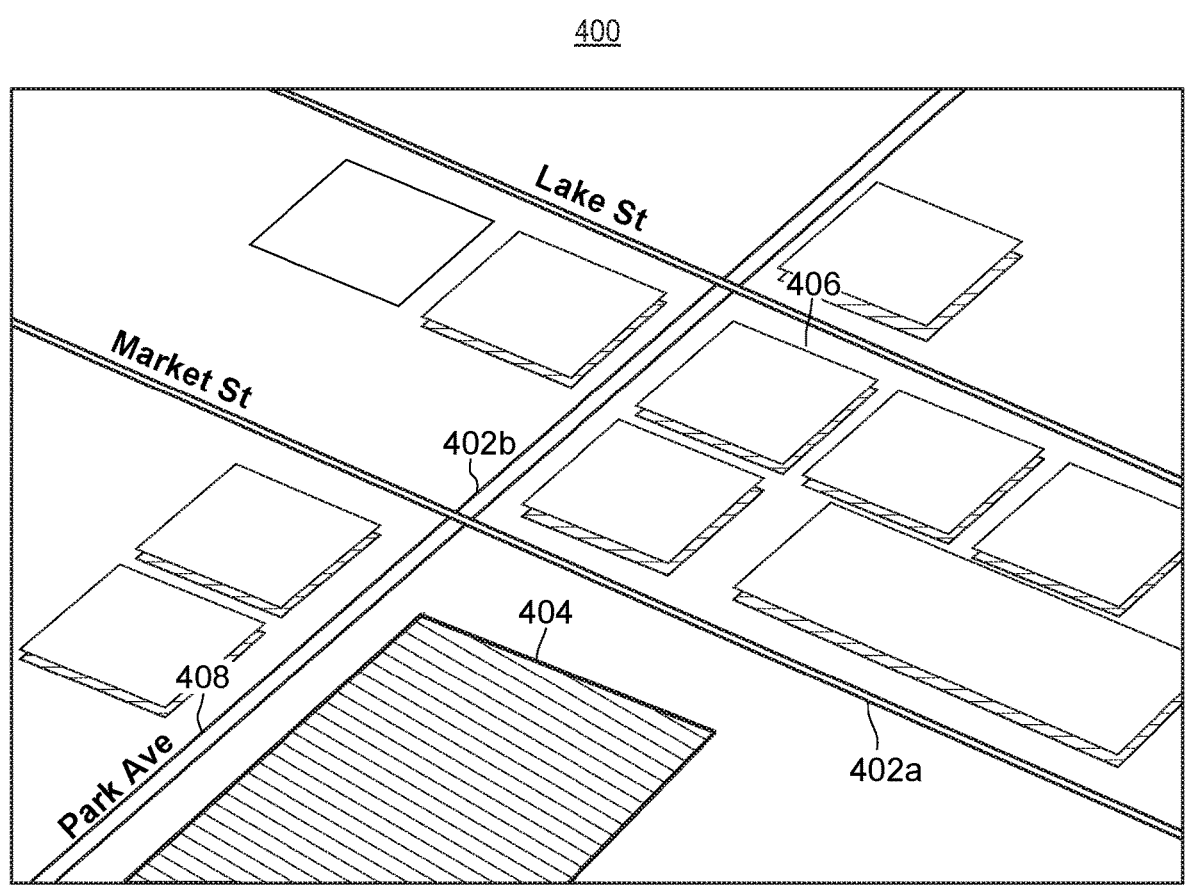
FIG. 4 is another example map display with map features rendered in a standard style.

FIG. 4 illustrates another example map display 400 that does not include a navigation route. For example, the mapping application 22 may present the map display 400 via the display 28 when the user launches the mapping application 22 or pans or zooms the digital map to view a particular geographic area. In the example map display 400, the map features, such as road segments 402a, 402b, 408, buildings 406, and parks 404 appear in the standard style 220, as shown in FIG. 2. For example, compared to the park 308 presented in the minimal style 210 in FIG. 3, the park 404 has a darker green fill color, a thicker line, and a darker outline color. Moreover, compared to the road segment 312 presented in the minimal style 210 in FIG. 3, the road segment 408 has a thicker line. Furthermore, compared to the building 310 presented in the rich style 230 in FIG. 3, the building 406 is two-dimensional rather than three-dimensional and has a smaller and lighter shadow.

Figure 5:
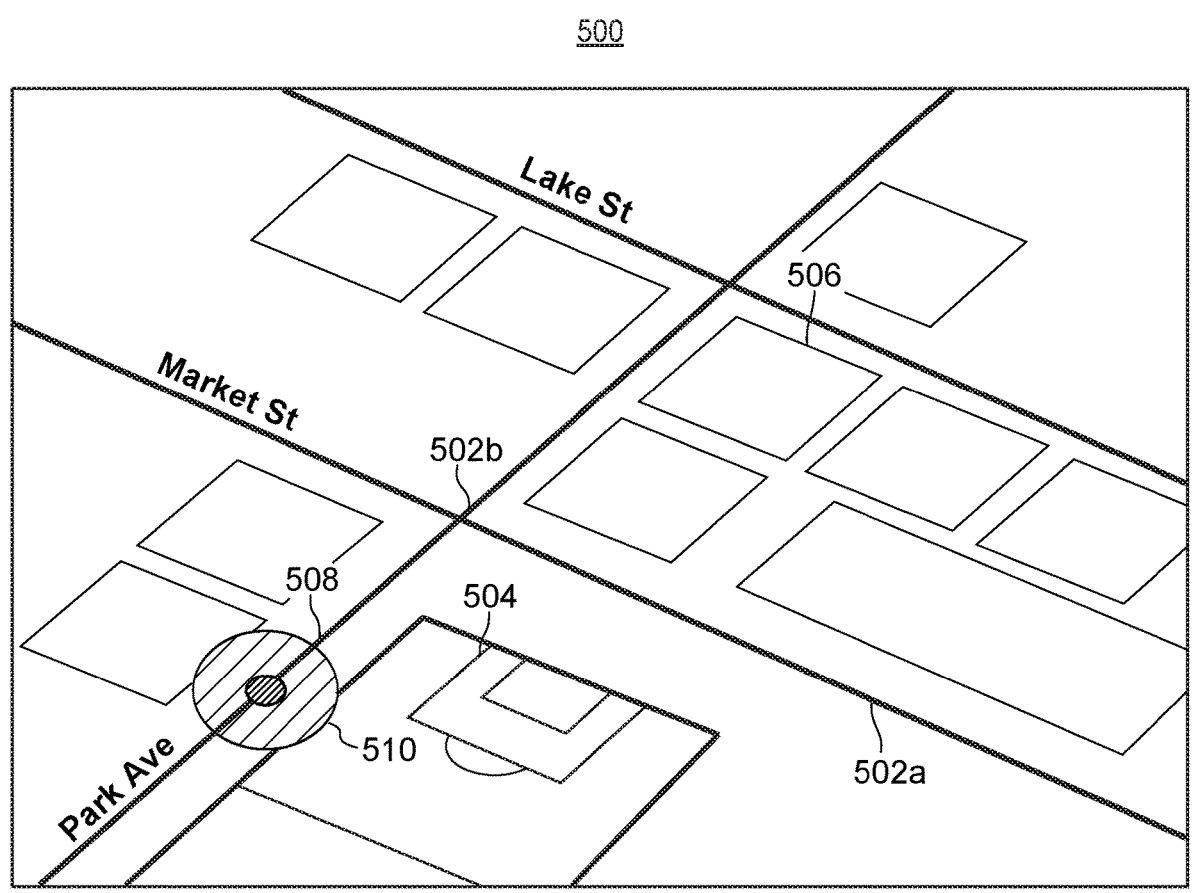
FIG. 5 is yet another example map display with some map features rendered in a rich style and other map features rendered in a minimal style.

FIG. 5 illustrates yet another example map display 500 that does not include a navigation route. In the example map display 500, the dynamic mapping system presents the park 504 in the rich style 230, while the remaining map features 502a, 502b, 506, 508 are in the minimal style 210 as shown in FIG. 2. For example, the dynamic mapping system may present the map display 500 via the display 28 when the user selects the park 504 as a search result within the mapping application 22. The dynamic mapping system then renders the park 504 in the rich style 230 instead of presenting a pin on the digital map at the park's location. Additionally, the dynamic mapping system may generate the map display 500 when the park 504 is a familiar location to the user, is within a threshold distance of the user's current location as depicted by the indicator 510, the user has an upcoming game or event at the park 504 according to the user's calendar, or for any other suitable reason to emphasize the park 504 within the map display 500. In any event, compared to the park 404 presented in the standard style 220, the park 504 includes a soccer field graphic rather than a green rectangular-shaped object.

Example Methods for Dynamically Restyling Map Features

Figure 6:
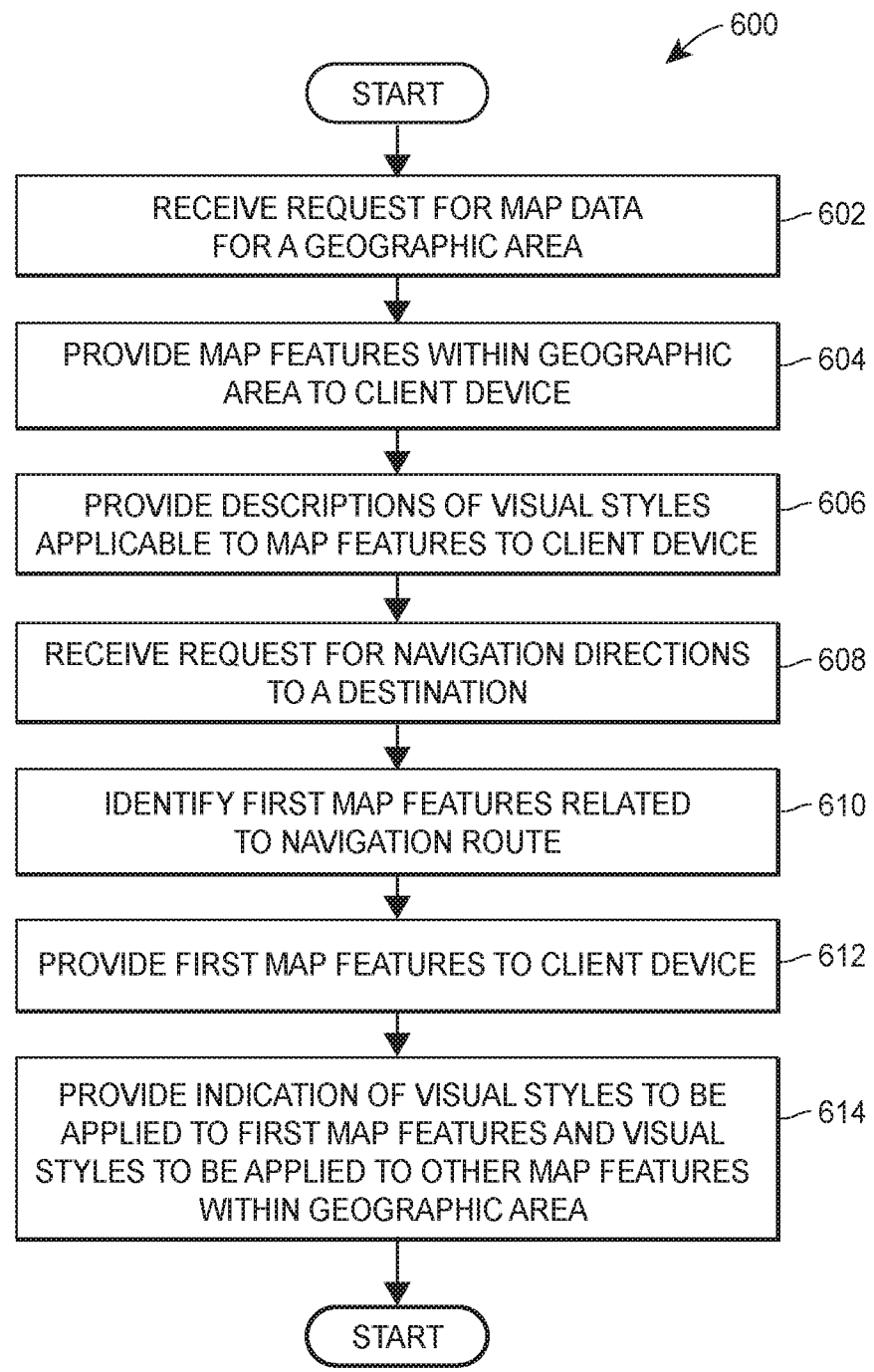
FIG. 6 is a flow diagram of an example method for providing navigation directions on a digital map, which can be implemented in a server device.

FIG. 6 illustrates a flow diagram of an example method 600 for providing navigation directions on a digital map. The method can be implemented in a set of instructions stored on a computer-readable memory and executable at one or more processors of the server device 36. For example, the method can be implemented by the style controller 38.

At block 602, a request for map data for a geographic area is received, for example from a mapping application 22 operating in a client device 10. In response to the request, map data for the geographic area is retrieved, for example from the map database 40 as shown in FIG. 1. The map data may include several map features which can be, for example, two- and three-dimensional shapes representing roads, buildings, POIs, parks, bodies of water, boundaries of cities, and other geographic entities. In some embodiments, each of the map features may have geometries described in a vector graphics format, or another suitable format for specifying geometric shapes using mathematical descriptions of points and paths connecting the points. Vector data generally allows client devices to scale, rotate, and otherwise operate on shapes without distortion. For example, rather than specifying each pixel that makes up a raster image of a line segment, vector data may specify the coordinates of two endpoints of the line segment and indicate that the two endpoints are connected by a straight line. In any event, the server device 36 provides the map features within the geographic area to the client device 10 (block 604).

In addition to providing the map features within the geographic area to the client device 10, the map data server 36 generates visual styles applicable to the map features, and provides descriptions of the visual styles to the client device 10 (block 606). For example, the map data server 36 may generate three visual styles: a minimal style, a standard style, and a rich style. Each visual style may include a set of configuration parameters for each of several map feature types (e.g., roads, buildings, POIs, parks, bodies of water, boundaries of cities, other geographic entities, etc.). The set of configuration parameters may include for example, a particular line thickness, a particular fill color, a particular outline color, a particular shape or graphic, a particular shadow color, a particular shadow thickness, etc. The visual styles may be provided to the client device 10 in a style table, similar to the style table 200 illustrated in FIG. 2. Accordingly, the client device 10 stores a local copy of the style table for rendering the map features according to the applicable visual styles.

For each map feature, the client device 10 may receive a geometry for the map feature and a visual style in which to render the map feature having a particular set of configuration parameters. For example, for a road segment, the client device 10 may receive coordinates of two endpoints of a line segment that are connected by a straight line. For the standard style, the client device 10 may receive a set of configuration parameters for road segments that includes a line thickness of 3 pt. and a line color of dark grey.

The client device 10 then may apply style data as appropriate to the specified line segment, so that the line segment is displayed with the applicable visual style including a particular color, width, etc. As another example, the vector data may specify the contour of a triangle, and the corresponding style data may specify the color of the contour lines, the width of the contour lines, and the color of the interior region of the triangle. In other words, rather than receiving raster images from the map data server 36, the client device 10 may receive instructions for drawing a map image on the display 28 and execute the instructions so as to generate a raster map image. In some cases, however, vector data also may include raster images as certain component elements that cannot be easily represented in a vector format.

In some embodiments, the map data server 36 provides instructions for styling each map feature to the client device 10, and the client device 10 renders the map features in the map display according to their respective styles. In other embodiments, the map data server 36 only provides the visual styles applicable to the particular map features. For example, when the digital map does not include a navigation route, the map features may be rendered in the standard style, and the map data server 36 only provides the standard style to the client device 10.

In any event, at block 608 a request for navigation directions to a destination is received, for example from the mapping application 22 operating in the client device 10. In response to the request for navigation directions, the map data server 36 retrieves a navigation route to the destination from the navigation server 33. The map data server 36 then identifies each of the map features related to the navigation route, such as a set of road segments along the navigation route, a building corresponding to the destination, etc. (block 610).

Then the map data server 36 provides the map features related to the navigation route to the client device 10 as a first set of map features (block 612). For example, the map data server 36 may provide an indication or reference to map features previously transmitted to the client device 10 and presented by the mapping application 22 in the digital map. More specifically, each map feature may have a feature ID which uniquely identifies the map feature. Rather than transmitting descriptions of the map feature once again to the client device 10, the map data server 36 may provide the feature ID as a reference to the map feature which is included in the first set of map features. In some embodiments, the client device 10 then re-renders the first set of map features using the rich style.

In other embodiments, the map data server 36 provides the map features related to the navigation route to the client device 10 as a first set of map features with the style data for the rich style (block 614) and/or with instructions for the client device 10 to re-render the first set of map features using the rich style. In particular, the request for navigation directions may specify styles explicitly by including styles unavailable at the client device 10, for example, or implicitly by providing a list of styles already available at the client device (e.g., styles stored in the style table). If the client device 10 has not received style data for the rich style, the map data server 36 provides the corresponding style data.

Also in some embodiments, the map data server 36 provides map features not related to the navigation route to the client device 10 as a second set of map features. For example, the map data server 36 may provide an indication or reference to map features previously provided and presented by the mapping application 22 in the digital map. More specifically, each map feature may have a feature ID which uniquely identifies the map feature. Rather than providing the map feature once again to the client device 10, the map data server 36 may provide the feature ID as a reference to the map feature which is included in the second set of map features. The client device then re-renders the second set of map features using the minimal style, and the remaining map features using the standard style. In other embodiments, the client device 10 re-renders each of the map features included in the digital map display and which are not in the first set of map features using the minimal style. In yet other embodiments, the map data server 36 provides map features not related to the navigation route to the client device 10 as a second set of map features with the style data for the minimal style (block 614) and/or with instructions for the client device 10 to re-render the second set of map features using the minimal style.

In other embodiments, the map data server 36 renders each of the map features according to the appropriate style. The map data server 36 then provides map tiles, i.e., a portion of a map image of a certain size (e.g., 256 by 256 pixels), including the rendered map features to the client device 10.

Figure 7:
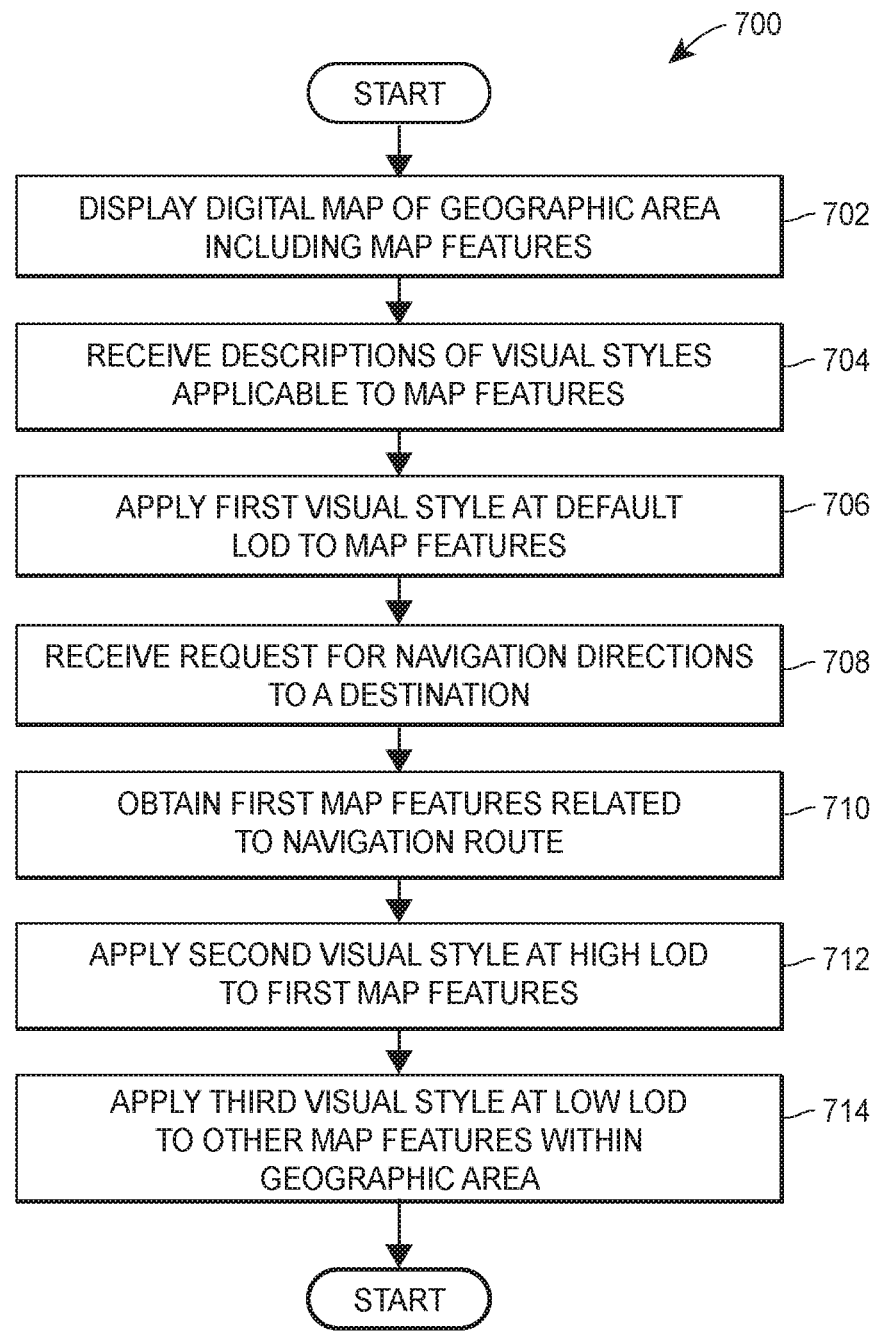
FIG. 7 is a flow diagram of an example method for illustrating navigation directions on a digital map, which can be implemented in a client device.

FIG. 7 illustrates a flow diagram of an example method 700 for illustrating navigation directions on a digital map. The method can be implemented in a set of instructions stored on a computer-readable memory and executable at one or more processors of the client device 10. For example, the method can be implemented by the dynamic map rendering engine 26.

At block 702, the client device 10 presents a digital map of a geographic area including several map features which can be, for example, two- and three-dimensional shapes representing roads, buildings, POIs, parks, bodies of water, boundaries of cities, and other geographic entities. To present the digital map, the client device 10 may receive geometries for each of the map features from a server device described in a vector graphics format, or another suitable format for specifying geometric shapes using mathematical descriptions of points and paths connecting the points. In other embodiments, the client device 10 retrieves geometries for each of the map features from offline map data stored locally at the client device.

The client device 10 may also receive descriptions of visual styles applicable to the map features from the server device (block 704), where each visual style includes a set of configuration parameters for each of several map feature types. For example, the visual styles may include a minimal style, a standard style, and a rich style. Each style may have a different set of configuration parameters for roads, buildings, POIs, parks, bodies of water, boundaries of cities, other geographic entities, etc. In some embodiments, the client device 10 receives and stores a style table including each of the styles and configuration parameters for rendering the map features. In other embodiments, the client device 10 receives the configuration parameters for a particular style, such as the standard style at a default level of detail and applies the particular style to the map features (block 706) to render the digital map.

Then at block 708, a request for navigation directions to a destination is received. The client device 10 may receive the request via user controls presented by the mapping application 22. For example, using the mapping application 22, the user may enter a destination and select a user control requesting directions from the user's current location to the destination. The client device 10 then obtains a navigation route to the destination. The navigation route may be obtained from a navigation server 33 or the client device 10 may retrieve offline navigation directions stored locally. In any event, a first set of map features are identified that are related to the navigation route (block 710), such as a set of road segments along the navigation route, a building corresponding to the destination, etc. The first set of map features may be a subset of the map features included in the digital map presented at block 702.

The client device 10 then applies the rich style at a high level of detail to the first set of map features (block 712). The client device 10 may also apply the minimal style at a low level of detail to the remaining map features in the digital map (block 714), such that the map features are re-rendered from the standard style to the rich or minimal styles. Also in some embodiments, the client device 10 obtains a second set of map features that are not related to the navigation route but within a threshold distance of the map features related to the navigation route. The client device 10 then applies the minimal style to the second set of map features, and applies the standard style to the remaining map features within the digital map.

In some embodiments, the map data server 36 provides the first or second sets of map features to the client device 10. For example, the map data server 36 may provide an indication or reference to map features previously provided and presented by the mapping application 22 in the digital map. More specifically, each map feature may have a feature ID which uniquely identifies the map feature. Rather than providing the map feature once again to the client device 10, the map data server 36 may provide the feature ID as a reference to the map feature which is included in the first or second sets of map features. In some embodiments, the client device 10 then re-renders the first set of map features using the rich style and the second set of map features using the minimal style. In other embodiments, the map data server 36 provides the first set of map features to the client device with the style data for the rich style, provides the second set of map features to the client device with the style data for the minimal style, and/or provides instructions for the client device 10 to re-render the first set of map features using the rich style and the second set of map features using the minimal style.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 600 and 700 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 600 and 700 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the methods 600 and 700 can be utilized with other objects and user interfaces. Furthermore, although the explanation above describes steps of the methods 600 and 700 being performed by specific devices (such as a server device 36 and a client device 10), this is done for illustration purposes only. The blocks of the methods 600 and 700 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for dynamically restyling map features through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for illustrating navigation directions on a digital map, the method comprising:

generating a digital map of a geographic area, including providing map features included in the digital map at a default level of detail;

obtaining, by one or more processors, a navigation route to a destination located in the geographic area;

identifying, by the one or more processors, a first plurality of map features corresponding to physical entities located in the geographic area and related to the navigation route; and generating a modified digital map, including re-rendering, by the one or more processors, the first plurality of map features at a high level of detail, wherein the modified digital map includes map features displayed at a low level of detail, wherein the default level of detail is higher than the low level of detail, and the high level of detail is higher than the default level of detail, and wherein the modified digital map does not include at least one of: an overlay corresponding to the navigation route or an overlay icon corresponding to the destination.

2. The method of claim 1, wherein the first plurality of map features includes road segments included in the navigation route.

3. The method of claim 2, further comprising:

identifying, by the one or more processors, a second plurality of map features corresponding to road segments not included in the navigation route;

wherein generating the modified digital map includes re-rendering, by the one or more processors, the second plurality of map features at the low level of detail.

4. The method of claim 2, wherein the first plurality of map features further includes a building corresponding to the destination.

5. The method of claim 1, further comprising:

transmitting, from a network server to a client device, descriptions of road geometries and respective descriptions of a plurality of visual styles applicable to the road geometries, the plurality of visual styles corresponding to the low level of detail, the default level of detail, and the high level of detail; and wherein generating the modified digital map including transmitting, from the network server to the client device, an indication of which of the previously transmitted visual styles are to be applied to the first plurality of map features.

6. The method of claim 5, further comprising:

in response to a request for map data of the geographic area, transmitting, from the network server to the client device, descriptions of map features within the geographic area and respective descriptions of the plurality of visual styles applicable to the road geometries, the plurality of visual styles corresponding to the low level of detail, the default level of detail, and the high level of detail for rendering the map features at the default level of detail; and in response to a request for navigation directions to the destination, transmitting, from the network server to the client device, descriptions of the first plurality of map features corresponding to physical entities located in the geographic area and related to the navigation route for rendering the first plurality of map features at the high level of detail and remaining map features within the geographic area at the low level of detail.

7. A server device for illustrating navigation directions on a digital map, the server device comprising:
one or more processors; and
a non-transitory computer-readable memory coupled to the one or more processors and storing instructions thereon that, when executed by the one or more processors, cause the server device to:
generate a digital map of a geographic area, including provide map features included in the digital map at a default level of detail;
obtain a navigation route to a destination located in the geographic area;
identify a first plurality of map features corresponding to physical entities located in the geographic area and related to the navigation route; and
generate a modified digital map, including re-render the first plurality of map features at a high level of detail, wherein the modified digital map includes map features displayed at a low level of detail, wherein the default level of detail is higher than the low level of detail, and the high level of detail is higher than the default level of detail, and wherein the modified digital map does not include at least one of: an overlay corresponding to the navigation route or an overlay icon corresponding to the destination.

8. The server device of claim 7, wherein the first plurality of map features includes road segments included in the navigation route.

9. The server device of claim 8, wherein the instructions further cause the server device to:
identify a second plurality of map features corresponding to road segments not included in the navigation route; and
re-render the second plurality of map features at a low level of detail.

10. The server device of claim 8, wherein the first plurality of map features further includes a building corresponding to the destination.

11. The server device of claim 7, wherein the instructions further cause the server device to:
transmit, to a client device, descriptions of road geometries and respective descriptions of a plurality of visual styles applicable to the road geometries, the plurality of visual styles corresponding to the low level of detail, the default level of detail, and the high level of detail; and
transmit, to the client device, an indication of which of the previously transmitted visual styles are to be applied to the first plurality of map features.

12. The server device of claim 11, wherein the instructions further cause the server device to:
in response to a request for map data of the geographic area, transmit, to the client device, descriptions of map features within the geographic area and respective descriptions of the plurality of visual styles applicable to the road geometries, the plurality of visual styles corresponding to the low level of detail, the default level of detail, and the high level of detail for rendering the map features at the default level of detail; and
in response to a request for navigation directions to the destination, transmit, to the client device, descriptions of the first plurality of map features corresponding to physical entities located in the geographic area and related to the navigation route for rendering the first plurality of map features at the high level of detail and remaining map features within the geographic area at the low level of detail.

13. A client device for illustrating navigation directions on a digital map, the client device comprising:
one or more processors; and
a non-transitory computer-readable memory coupled to the one or more processors and storing instructions thereon that, when executed by the one or more processors, cause the client device to:
display a digital map of a geographic area including map features presented at a default level of detail;
receive a request for navigation directions to a destination located in the geographic area;
obtain descriptions of a first plurality of map features corresponding to physical entities located in the geographic area and related to a navigation route to the destination;
display the first plurality of map features within the digital map at a high level of detail; and
display other map features within the digital map at a low level of detail, wherein the default level of detail is higher than the low level of detail, and the high level of detail is higher than the default level of detail, and wherein the digital map does not include at least one of: an overlay corresponding to the navigation route or an overlay icon corresponding to the destination.

14. The client device of claim 13, wherein the first plurality of map features includes road segments included in the navigation route.

15. The client device of claim 13, wherein the first plurality of map features includes a building corresponding to the destination.

16. The client device of claim 13, wherein the instructions further cause the client device to:
receive, from a server device, descriptions of map features within the geographic area and respective descriptions of a plurality of visual styles, the plurality of visual styles corresponding to the low level of detail, the default level of detail, and the high level of detail; and
display the digital map according to the received descriptions of map features within the geographic area and the received description of the default level of detail.

17. The client device of claim 16, wherein the instructions further cause the client device to:
in response to receiving the request for navigation directions to the destination, receive, from the server device, descriptions of road geometries corresponding to the first plurality of map features and indications of which of the transmitted visual styles are to be applied to the first plurality of map features.

* * * * *